Feb. 5, 1957    L. E. SIMMONS    2,780,334
FLUID OPERATED CLUTCH MECHANISM
Filed April 1, 1948    5 Sheets-Sheet 1

Inventor:
Leon E. Simmons.
by Charles F. Osgood,
Attorney.

Feb. 5, 1957  L. E. SIMMONS  2,780,334
FLUID OPERATED CLUTCH MECHANISM
Filed April 1, 1948  5 Sheets-Sheet 2

Inventor:
Leon E. Simmons.
by Charles F. Osgood,
Attorney.

Feb. 5, 1957 L. E. SIMMONS 2,780,334
FLUID OPERATED CLUTCH MECHANISM
Filed April 1, 1948 5 Sheets-Sheet 3
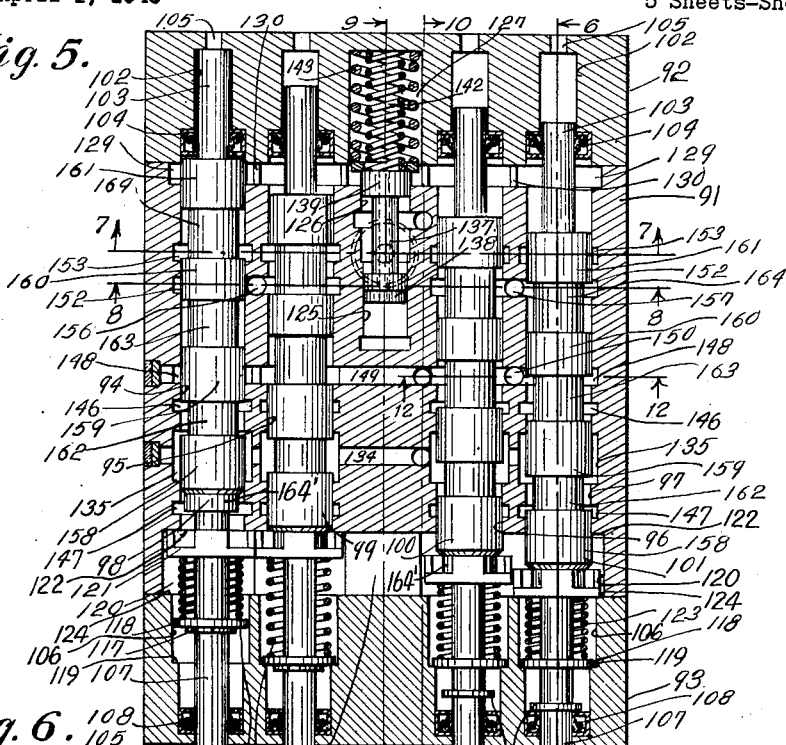
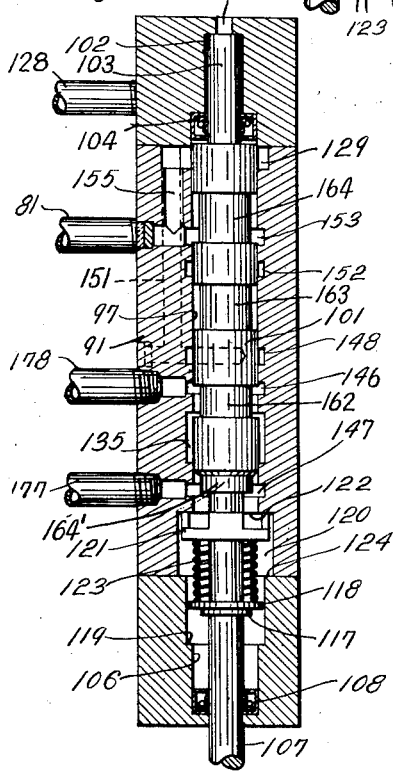
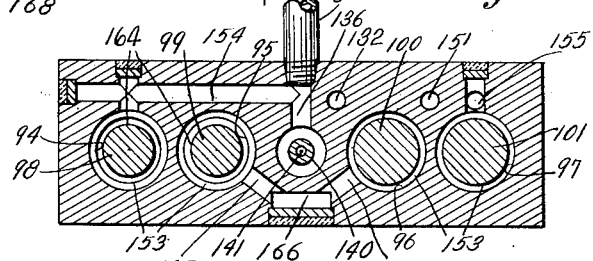
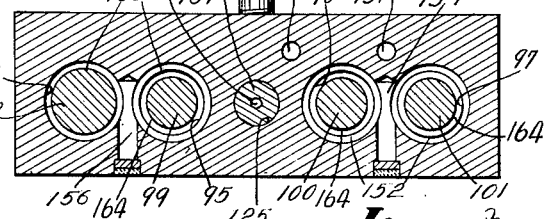
Inventor:
Leon E. Simmons.
by Charles F. Osgood,
Attorney.

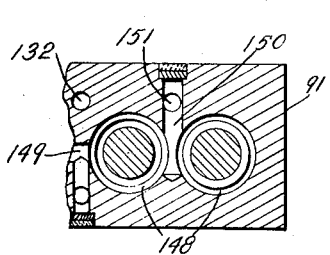

Feb. 5, 1957  L. E. SIMMONS  2,780,334
FLUID OPERATED CLUTCH MECHANISM
Filed April 1, 1948  5 Sheets-Sheet 5

Inventor:
Leon E. Simmons.
by Charles F. Osgood,
Attorney.

United States Patent Office 2,780,334
Patented Feb. 5, 1957

2,780,334

FLUID OPERATED CLUTCH MECHANISM

Leon E. Simmons, Claremont, N. H., assignor to Joy Manufacturing Company, Pittsburgh, Pa., a corporation of Pennsylvania Application April 1, 1948, Serial No. 18,465

5 Claims. (Cl. 192—87)

This invention relates to clutch mechanisms and more particularly to a hydraulically operated controlling means for a clutch mechanism.

An object of this invention is to provide an improved clutch mechanism. Another object is to provide an improved hydraulic operating means for a clutch. Yet another object is to provide an improved control valve means for a clutch mechanism. A further object is to provide an improved fluid operated clutch mechanism clutch operating cylinder. A still further object is to provide an improved fluid operated clutch mechanism embodying high and low speed clutches and improved fluid operated control means for the clutches. These and other objects and advantages of the invention will however hereinafter more fully appear.

In the accompanying drawings there is shown for purposes of illustration one form which the invention may assume in practice.

In these drawings:

Fig. 5 is an enlarged horizontal sectional view illustrating the control valve mechanism.

Fig. 6 is a longitudinal vertical sectional view taken on line 6—6 of Fig. 5, with the valve in a different position.

Figs. 7 and 8 are cross-sectional views taken respectively on lines 7—7 and 8—8 of Fig. 5.

Figs. 9 and 10 are longitudinal vertical sectional views taken respectively on lines 9—9 and 10—10 of Fig. 5.

Fig 11 is a side elevational view of the valve mechanism.

Fig. 12 is a fragmentary cross-sectional view taken on line 12—12 of Fig. 5.

Fig. 13 is a rear end view, and Fig. 14 is a front end view of the valve mechanism.

Figure 15:
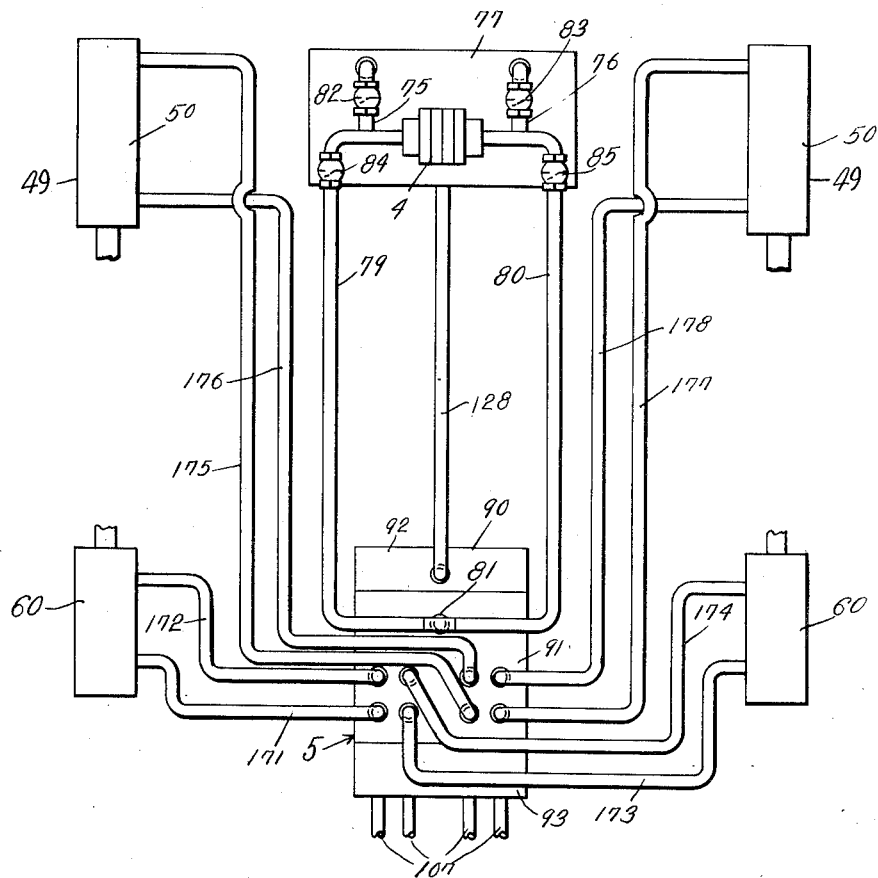

Fig. 15 is a diagrammatic view illustrating the hydraulic system.

In this illustrative construction, as shown in the drawings, a machine frame 6 carries a reversible motor 8 which has fixed to the rear end of its power shaft a spur pinion 17 which drives a spur gear 18 secured to the drive shaft 19 of a pumping means 4. The motor pinion also meshes with and drives a spur gear 20 suitably journaled within the machine frame and which, in turn, meshes with and drives spur gears 21 and 22, arranged on parallel horizontal axes extending longitudinally of the machine frame and spaced equidistantly from the motor shaft at the opposite sides of the machine frame.

Figure 1:
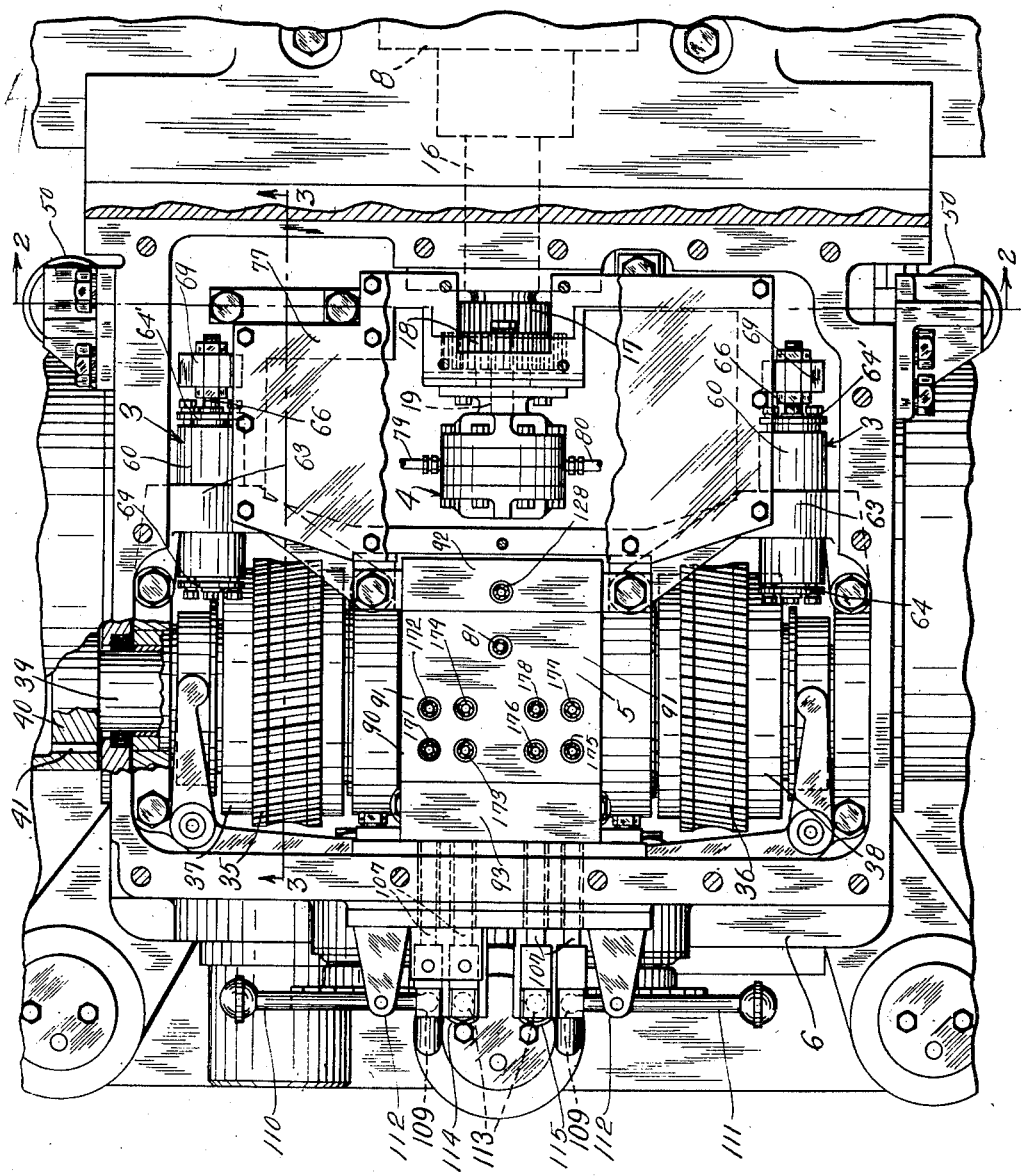
Fig. 1 is an enlarged fragmentary plan view, with the top cover removed and with parts broken away to illustrate structural details.
Figure 2:
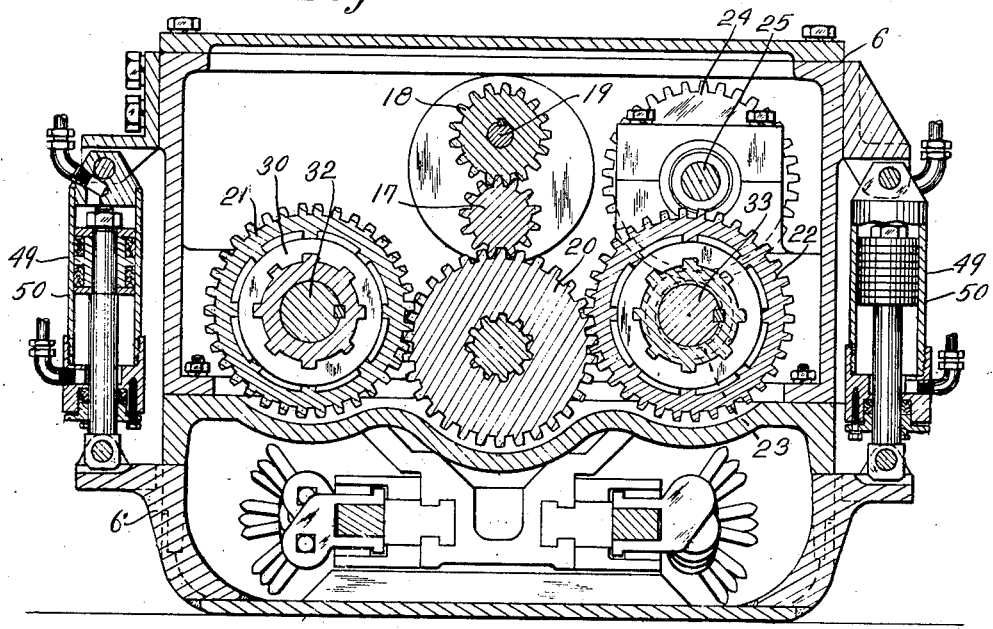
Fig. 2 is a cross-sectional view taken substantially on line 2—2 of Fig. 1.
Figure 3:
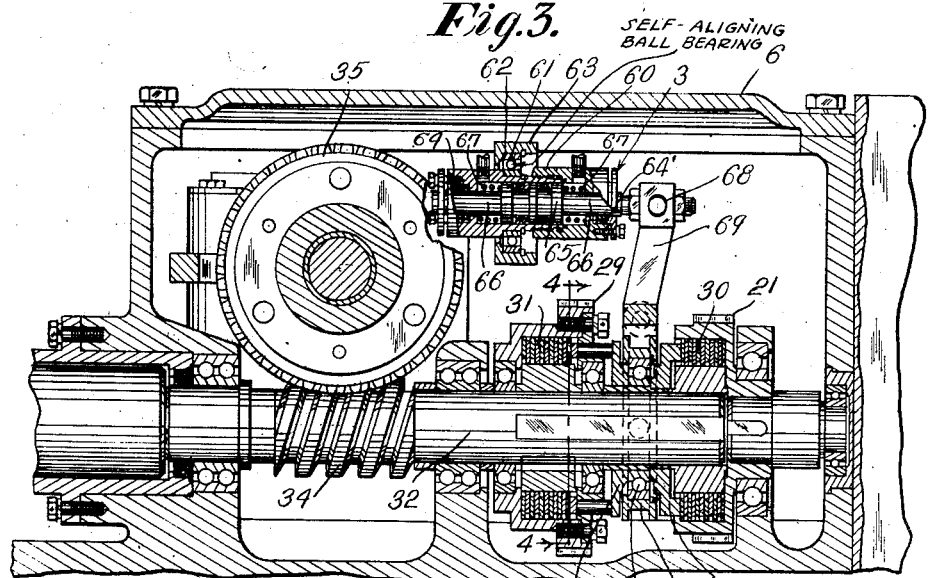
Fig. 3 is a view in longitudinal vertical section taken substantially on line 3—3 of Fig. 1, showing a hydraulic clutch control.
Figure 4:
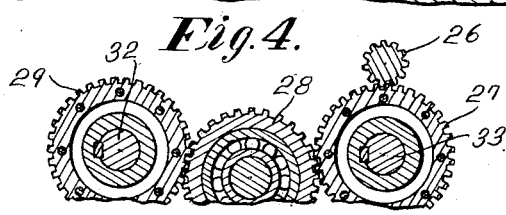
Fig. 4 is a fragmentary vertical sectional view taken on line 4—4 of Fig. 3, showing details of the slow speed drive gearing.

Rotatable with and driven by the gear 22 is a spur pinion 23 (shown in dotted lines in Fig. 2) meshing with a spur gear 24 secured to a longitudinally extending shaft 25. Driven by the shaft 25 is a spur pinion 26 (Fig. 4) which meshes with and drives a spur gear 27 coaxial with the spur gear 22. The gear 27 meshes with and drives a spur gear 28 which, in turn, meshes with and drives a spur gear 29 coaxial with the spur gear 21. The spur gears 21 and 22 constitute the high speed terminal driving gears, and the spur gears 27 and 29 constitute the low speed terminal driving gears. The gears 21 and 29 are connectible by multiple disk clutches 30 and 31 to a coaxial longitudinal shaft 32, and the gears 22 and 27 are connectible by similar clutches (not shown) to a coaxial shaft 33. These longitudinal shafts 32 and 33 are suitably journaled within the machine frame and have secured thereto worms 34 (one of which is shown in Fig. 3) which mesh with and drive worm wheels 35 and 36. The worm wheels are connectible by similar multiple disk clutches 37 and 38 to coaxial aligned shafts 39 (one of which is shown in Fig. 1). These aligned shafts drive spur gears 40, one secured to each shaft and meshing with internal gears 41. Since the fast and slow speed driving gearings are identical, illustration of both gearings herein is unnecessary, and each gear 41 may be driven at either a low speed or a relatively high speed under the control of the disk clutches 30, 31 and the clutch which is associated with it, 37 or 38. When the clutches 30 and 31 are released, the worm gearings remain stationary as regards rotation, and the clutches 37 and 38 may then serve as brakes to control rotation of the gears 41 in the reverse direction under the control of frictional resistance. The improved hydraulic control means for these clutches will now be described.

The improved hydraulic control means 3 for the fast and slow speed controlling clutches are identical, and, therefore, only a description of the control means for the clutches 30 and 31 will be given in detail. This control means, as shown most clearly in Fig. 3, comprises a hydraulic actuator including a hydraulic cylinder 60 supported for universal tilting movement within the inner race of a conventional self-aligning ball bearing 61, the outer race of the latter in turn being supported within a bore 62 of a bracket 63 suitably mounted within the machine frame. The cylinder has stuffing boxes 64 and 64' at its opposite ends, and reciprocable in this cylinder is a piston 65 having oppositely extending piston rods 66 extending outwardly through the stuffing boxes so that equal opposed pressure areas are provided at the opposite sides of the piston. Arranged between the opposite ends of the cylinder bore and the opposite faces of the piston are coil springs 67 of equal strength which tend to maintain the piston in its centered neutral position within the cylinder bore. The front piston rod of the piston projects forwardly from the cylinder and is pivotally connected at 68 on a transverse axis to a shipper yoke 69, in turn pivotally mounted within the machine frame to swing on a parallel axis. This shipper yoke engages a shipper ring 70 which surrounds and engages a ball thrust bearing 71, the latter arranged between pressure plates 72 and 73 for operating the clutches. Thus, when liquid under pressure is properly supplied to one end of the cylinder 60, one or the other of the disk clutches 30, 31 may be applied while the other is released, and by trapping the liquid within the cylinder, the active clutch may be locked in applied position. When liquid is vented from the cylinder, the springs 67 automatically return the piston to its centered neutral position wherein both clutches are released.

The pumping means 4 is reversible and comprises a conventional gear pump having its opposite sides connected by conduits 75, 76 to a liquid reservoir 77, herein a tank arranged within the machine frame and preferably containing a light oil and provided with a filler plug at the top of the machine frame. Branch conduits 79 and 80 lead to a conduit 81 connected to the pressure passages of the valve mechanism 5, as later described in detail. Connected to the conduits 75 and 76 are check valves 82 and 83 which permit liquid flow from the tank to the pump but which automatically prevent reverse flow. Connected in the branch conduits 79 and 80 are check valves 84 and 85 which permit liquid flow from the pump to the pressure conduit 81 of the valve mechanism but which automatically prevent reverse flow. By such arrangement, the pump may be driven by the machine motor 8 in either direction, and liquid under pressure may be supplied to the pressure conduit 81 irrespective of the direction of drive. During drive in one direction, liquid may flow from the tank through conduit 76, past the check valve 83 to the suction side of the pump, and liquid under pressure may be discharged from the pressure side of the pump, past the check valve 84 through the conduit 79 to the pressure conduit 81. During reverse drive, liquid may flow from the tank through conduit 75, past the check valve 82 to the suction side of the pump and from the pressure side of the pump past the check valve 85 and through conduit 80 to the pressure conduit 81.

Now referring to the improved control valve mechanism 5, it will be noted that a rectangular valve box 90 is arranged horizontally within the rear end of the machine frame, and this valve box comprises a central body 91 and front and rear end heads or caps 92 and 93 suitably secured, as by screws, to the body. Extending longitudinally of the body are parallel horizontal bores 94, 95, 96 and 97 respectively containing reciprocable balanced spool type slide valves 98, 99, 100 and 101. The front head 92 has bores 102 aligned with the valve receiving bores, and the valves have stems 103 passing forwardly through sealing packings 104. The bores 102 at the outer sides of the packings are vented through ports 105. The rear head has bores 106 aligned with the valve receiving bores, and stems 107 on the valves extend rearwardly through sealing packings 108. The stems 107 of the two outer valves 98 and 101 are pivotally connected at 109 to oppositely extending horizontal hand levers 110 and 111 which are pivotally supported by brackets 112. The stems 107 of the two inner valves 99 and 100 are pivotally connected at 113 to vertical hand levers 114 and 115 pivotally mounted on similar brackets. Thus, the valve operating levers are conveniently located near the operator's station at the rear end of the machine.

The slide valves, when the valve levers are released, move automatically into and are held in neutral position, and the second valve from the left, as viewed in Fig. 5, is shown in such position. To accomplish this function, each rearward valve stem 107 has a collar 117 fixed thereto, and surrounding the stems in advance of the collars are washers 118, the latter adapted to seat against shoulders 119 in the bores 106. The central body of the valve box has rear bores 120 communicating with the head bores 106, and spiders 121 surrounding the valve stems 107 are adapted to seat against the front walls 122 of these bores and to be engaged by reduced rear end portions of the valve bodies. Encircling the stems 107 between the washers and the spiders are coil springs 123 which yieldingly urge the washers and spiders apart. When the valves are in neutral position, in engagement with the collars 117, the washers are seated against the shoulders 119 and the spiders are seated against the walls 122 and engaged by the reduced rear end portions of the valve bodies. When the valves are slid forwardly to the position shown at the left in Fig. 5, the washers 118 move away from their seats, and the springs are compressed so that when the valve levers are released, the springs return the valve to neutral position. When the valves are slid rearwardly to the position shown second from the right in Fig. 5, the spiders 121 are forced from their seats and the springs are compressed so that when the valve levers are released, the springs return the valves to neutral position. When the valves are moved rearwardly to the right hand position shown in Fig. 5, the spiders 121 seat against the opposite end walls 124 of the bores 120 so that further rearward movement of the valves is limited by the spiders which then serve as stops. In this position also, the springs return the valves to neutral position when the valve levers are released.

The central body 91 of the valve box has a central longitudinal bore 125 (Fig. 9) and a coaxial larger bore 126. A chamber 127 in the front head is connected by a return conduit 128 back to the tank 77. At the front end of the body, coaxial with each valve receiving bore, is an enlarged shallow bore 129 connected by ports 130 into lateral communication with one another, and the head chamber 127 communicates with the central one of these bores (as shown in Fig. 5) so that the bores 129 are connected to exhaust. Formed in the walls of the bore 126 is an annular groove 131 which is connected by a longitudinal passage 132 (Fig. 10) with a vertical passage 133 which communicates with a transverse pressure passage 134. Annular grooves 135 in the walls of the valve receiving bores communicate with the passage 134. A passage 136 (Fig. 9) connects the pressure conduit 81 with the rear end of the bore 126. Reciprocable in the bores 125, 126 is a combined pilot and relief valve 137 of the spool type having a rear spool 138 fitting the small bore 125 and a larger spool 139 fitting the larger bore 126. The spools are connected by a reduced portion 140. Extending axially through the valve is a passage 141 for connecting the bore at the rear side of the spool 138 with the exhaust chamber 127. Arranged in the head chamber are concentrically arranged coil springs of different size and strengths, and the light inner spring 142 acts on the front end of the valve 137 while the heavier outer spring 143 acts on a washer 144 which engages the front end of the valve and is adapted to seat against the rear wall 145 of the central bore 129. When there is no pressure in the passage 136, the light spring 142 holds the valve 137 in its rearmost position, with the groove 131 closed by the front valve spool 139, and at that time the washer 144 is seated against the wall 145. This valve mechanism is being claimed in a copending application, Serial No. 209,745, filed February 7, 1951, which is a division of this case, now matured into Patent No. 2,772,694, dated December 4, 1956.

When liquid under pressure is supplied through conduit 81 to the passage 136, the pressure acting on the effective rear pressure area of the large valve spool 139 forces the valve forwardly against the action of the spring 142 until it is stopped by engagement with the washer 144, and the groove 131 is opened so that liquid under pressure may flow from the passage 136 and passages 132, 133 and 134 to the pressure grooves 135. Formed in the walls of the valve receiving bores longitudinally thereof at opposite sides of the pressure grooves 135 are narrow annular service grooves 146 and 147, while spaced forwardly of the grooves 146 are narrow annular grooves 148 which are connected in communication with one another by a transverse passage 149 which communicates with a vertical passage 150 connected to a longitudinal passage 151 communicating with one of the end exhaust chambers 129. Also formed in the walls of the valve receiving bores and spaced longitudinally thereof in advance of the grooves 148 are relatively narrow annular bypass grooves 152 and 153. As shown in Fig. 7, a transverse passage 154 connects the pressure passage 136 with the left hand groove 153, and a longitudinal discharge passage 155 connects the right hand groove 153 with one of the end exhaust chambers 129. As shown in Fig. 8, a passage 156 connects the pair of left hand grooves 152 together, and a similar passage 157 connects the right hand pair of grooves together. The slide valves each have four longitudinally spaced spools 158, 159, 160 and 161 separated by reduced portions to provide three annular spaces or grooves 162, 163 and 164 between the spools, and the rear end of each valve is reduced at 164'. When the valves are in neutral position, liquid under pressure may flow from passage 136 through passage 154 to the left hand groove 153, through the annular space 164 of the left hand valve 98 to the left hand groove 152, through passage 156 to the next adjacent groove 152 and through the annular space 164 of the next adjacent valve 99 to the next adjacent groove 153. Liquid may then flow from the groove 153 to a passage 165, a bore 166 and a passage 167 to the adjacent groove 153 next to the right in Fig. 5, and fluid flows from this groove through the annular space 164 of the valve 100 second from the right in Fig. 5 to the next adjacent groove 152 and from the latter through passage 157 to the right hand groove 152, and thence through the space 164 in the right hand valve 101 to the right hand groove 153 and through passage 155 and the communicating bore 129 to exhaust. When any of the slide valves is moved to cut off communication between the grooves 152 and 153, the bypass is closed, and pressure will build up in the bore 126 to move the pilot valve 137 from its closed position to the position shown in Figs. 5 and 9, and, at that time, liquid under pressure may flow through groove 131 and passages 132, 133 and 134 to the annular pressure grooves 135. The bores 120 at the rearward end of the central body are connected in communication with one another through a transverse passage 168 which is connected by a longitudinal passage 169 (see Fig. 10) which communicates with the transverse exhaust passage 149. As shown diagrammatically in Fig. 15, the annular service grooves 146 and 147 of the left hand valve receiving bore 94 are connected by conduits 171 and 172 to the opposite ends of the left hand clutch operating cylinder 60 which controls the low and high speed clutches 30, 31. The service grooves 146 and 147 of the next adjacent valve receiving bore 95 are connected by conduits 173 and 174 to the opposite ends of the right hand clutch operating cylinder 60 for controlling the high and low speed clutches 30, 31. The service grooves 146 and 147 of the valve receiving bore 96 are connected by conduits 175 and 176 to the opposite ends of a cylinder 50 of a tilting jack 49, while the service grooves 146 and 147 of the right hand valve receiving bore 97 are connected by conduits 177 and 178 to the opposite ends of a cylinder 50 of a tilting jack 49. The jacks 49 are embodied in a tilting mechanism for the machine which is being claimed in a copending application, Serial No. 209,744, filed February 7, 1951, which is a division of this case, and now matured into Patent No. 2,661,939, granted December 8, 1953. When the valves are moved to the position shown at the left in Fig. 5, liquid under pressure may flow from the grooves 135 to the grooves 146, while the grooves 147 are connected to the exhaust bores 120. When the valves are slid into the right hand position shown in Fig. 5, liquid under pressure may flow from the grooves 135 to the grooves 147, while the grooves 146 are connected to the exhaust grooves 148. When the valves are in the position shown second from the right in Fig. 5, the liquid is trapped in the grooves 147, while the grooves 146 are connected to exhaust. When the valves are positioned as shown second from the left in Fig. 5, the liquid is trapped in both grooves 146 and 147. The valves may also be positioned to connect either groove 146, 147 with the exhaust while liquid is trapped in the other groove. It is accordingly evident that by suitable positioning of the slide valves 98, 99, 100 and 101, liquid under pressure may be supplied to either end of the cylinders 50 and 60, while the other end is connected to exhaust, or the slide valves may be positioned to trap liquid within the cylinders. Due to the arrangement of the valve controlled passages each of the clutch operating cylinders 60 is always vented at one end prior to the connection of the other end to the fluid supply. In the event the pressure in the system becomes excessive due to overload, the pressure in the bore 126 acting on the effective rear pressure area of the spool 139 of the valve 137 will move the latter forwardly against the action of the heavier spring 143 to connect the groove 131 with the central bore 129 which communicates with the exhaust chamber 127, thereby to reduce the pressure in the system.

As a result of this invention an improved clutch mechanism is provided whereby control of the machine may be effected in an improved and more efficient manner. By the provision of the hydraulic control for the clutch operating means, the fast and slow speed clutches may be easily and quickly operated under the control of the control valves. The improved control valve mechanism, due to its novel valve and passage arrangement, results in an improved control of the several hydraulic functions of the machine. The reversible pump arrangement enables reverse operation of the machine while automatically maintaining the desired pressure in the system. By the provision of the improved universal pivotal mounting for the clutch operating cylinders binding of the parts is avoided. Other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a clutch operating mechanism, a clutch, a pivoted shipper for said clutch operatively connected to the latter, a fluid cylinder, a piston reciprocable in said cylinder and having a piston rod pivotally connected to said shipper, and a universal pivotal mounting for said cylinder comprising a self-aligning ball bearing having inner and outer races, the inner race receiving and supporting said cylinder, and a stationary support for the outer bearing race.

2. In a clutch operating mechanism, a clutch, a pivoted shipper for said clutch operatively connected to the latter, a fluid operated actuator for said shipper operatively connected to the latter, and a universal pivotal mounting for said actuator including a self-aligning ball bearing having inner and outer races, said inner race receiving and supporting said actuator, and a stationary support for said outer bearing race.

3. In a fluid operated clutch mechanism, the combination comprising high and low speed clutches, fluid operated control means for said clutches for alternatively applying the same comprising a fluid cylinder, a reciprocable piston contained in said cylinder and having equal opposed pressure areas and a clutch shifter for alternatively applying and releasing said clutches and operatively connected to said piston, said shifter movable in one direction to apply one clutch and movable in the opposite direction to apply said other clutch, and a control valve mechanism including supply and vent passages and a shiftable control valve movable into positions to effect the flow of fluid under pressure from said supply passage only alternatively to the opposite ends of said cylinder at opposite sides of said piston and also positionable to effect simultaneous connection of the opposite ends of said cylinder with said vent passages, said control valve also being positionable to cut off communication of the ends of said cylinder with said vent passages to trap fluid in the opposite ends of said cylinder to lock said piston in adjusted position with one of said clutches held in applied position.

4. In a fluid operated clutch mechanism, the combination comprising high and low speed clutches, fluid operated shifting means for said clutches including a fluid cylinder containing a reciprocable piston having equal opposed pressure areas and a clutch shifter for alternatively applying and releasing said clutches and operatively connected to said piston, said shifter movable in one direction to apply one clutch and movable in the opposite direction to apply said other clutch, a control valve mechanism embodying supply and exhaust passages and a shiftable control valve, said supply and exhaust passages controlled by said valve mechanism for supplying fluid under pressure to one end of said cylinder while the other end is connected to exhaust, said supply and exhaust arranged so that one end of said cylinder is always connected to exhaust by said valve prior to the positioning of said valve to supply fluid to the opposite end of said cylinder, and said valve positionable to disconnect said cylinder from both said supply and said exhaust thereby to trap fluid in said cylinder to lock said piston in adjusted position with one or the other of said clutches applied.

5. In a fluid operated clutch mechanism, the combination comprising a low speed clutch and a high speed clutch, fluid operated control means for said high and low speed clutches including a fluid cylinder containing a reciprocable piston having equal opposed pressure areas and clutch shifter means operatively connected to said piston and movable in one direction by said piston to apply one clutch and movable in the opposite direction by said piston to apply said other clutch, a control valve mechanism including supply and vent passages and a shiftable control valve movable into positions to effect flow of fluid under pressure from said supply passage only alternatively to the opposite ends of said cylinder at opposite sides of said piston and also positionable to effect simultaneous connection of the opposite ends of said cylinder with said vent passages, and oppositely acting springs in coaxial relation with said piston and of identical strength acting on the opposite sides of said piston for returning the latter to its neutral position to effect release of both clutches when both ends of said cylinder are vented, said control valve also being positionable to close said vent passages to trap fluid in the opposite ends of said cylinder to lock said piston in adjusted position during application of either clutch.

References Cited in the file of this patent

UNITED STATES PATENTS

| Number | Name | Date |
|---|---|---|
| 861,805 | Camp | July 30, 1907 |
| 901,729 | Niessner | Oct. 20, 1908 |
| 984,426 | Hennifin | Feb. 14, 1911 |
| 1,470,573 | Holmes | Oct. 9, 1923 |
| 1,514,048 | Holmes | Nov. 4, 1924 |
| 1,891,618 | Campbell | Dec. 20, 1932 |
| 2,117,852 | Pearmain | May 17, 1938 |
| 2,131,178 | Joy et al. | Sept. 27, 1938 |
| 2,211,781 | Joy | Aug. 20, 1940 |
| 2,212,289 | Farmer | Aug. 20, 1940 |
| 2,244,213 | Patton | June 3, 1941 |
| 2,289,567 | Berglund | July 14, 1942 |
| 2,339,523 | Sloane | Jan. 18, 1944 |
| 2,386,512 | Smith | Oct. 9, 1945 |
| 2,429,323 | Lindgren | Oct. 21, 1947 |
| 2,437,430 | Lawrence | Mar. 9, 1948 |
| 2,455,271 | Raymond | Nov. 30, 1948 |
| 2,464,538 | Vander Zee | Mar. 15, 1949 |
| 2,465,942 | Sundt | Mar. 29, 1949 |

FOREIGN PATENTS

| Number | Country | Date |
|---|---|---|
| 905,289 | France | Nov. 29, 1945 |